United States Patent [19]

Duncan

[11] 4,089,133

[45] May 16, 1978

[54] DEVICE FOR LIQUID FEEDING OF POTTED PLANTS AND THE LIKE

[76] Inventor: Vinal S. Duncan, 35 Lindsley Dr., Wolcott, Conn. 06716

[21] Appl. No.: 748,633

[22] Filed: Dec. 8, 1976

[51] Int. Cl.² ............................................. A01G 29/00
[52] U.S. Cl. ........................................................ 47/48.5
[58] Field of Search .................................. 47/48.5, 81

[56] References Cited

U.S. PATENT DOCUMENTS

| 644,703 | 3/1900 | Buckley | 47/48.5 |
| 2,145,934 | 2/1939 | Kingman | 47/48.5 X |
| 2,458,027 | 1/1949 | Quist | 47/81 X |
| 2,837,869 | 6/1958 | Chatten | 47/48.5 |
| 3,345,774 | 10/1967 | Delbuguet | 47/48.5 |
| 3,821,863 | 7/1974 | Chan | 47/48.5 |
| 3,871,131 | 3/1975 | Berglund | 47/81 |
| 3,972,629 | 8/1976 | Whalen, Jr. | 47/81 |

FOREIGN PATENT DOCUMENTS

| 1,061,015 | 11/1953 | France | 47/81 |
| 1,801,268 | 5/1970 | Germany | 47/48.5 |
| 549,898 | 10/1930 | Germany | 47/48.5 |
| 191,693 | 12/1906 | Germany | 47/48.5 |
| 122,349 | 5/1900 | Germany | 47/48.5 |
| 183,168 | 1/1906 | Germany | 47/81 |
| 1,064,281 | 8/1959 | Germany | 47/81 |
| 14,289 of | 1909 | United Kingdom | 47/81 |

Primary Examiner—E. H. Eickholt
Attorney, Agent, or Firm—McCormick, Paulding & Huber

[57] ABSTRACT

A device for the liquid feeding of potted plants and the like comprises an open end elongated tubular reservoir element for holding approximately one to four ounces of liquid. The element is of such length that a lower end portion thereof will be disposed in the root region of a plant when the element is embedded in the soil adjacent the plant. A top closure or cap element is provided and a bottom closure and absorption type transfer element projects upwardly and tightly fits the lower portion of the interior wall of the reservoir element. A continuous upwardly exposed surface on the absorption element receives liquid from the reservoir and the liquid is transferred through the element with the aid of gravity to a downwardly projecting portion thereof which has an exposed surface of reduced cross sectional dimension. The element has the general characteristics of the tip of a felt tip pen and transfers the liquid for absorption by the soil at a rate which provides for soil absorptive action over a period of at least several days.

9 Claims, 3 Drawing Figures

DEVICE FOR LIQUID FEEDING OF POTTED PLANTS AND THE LIKE

BACKGROUND OF THE INVENTION

Various types of liquid feeding devices have been available in the past for the watering and nourishment of potted plants and the like. Such devices have been generally satisfactory but certain disadvantages have been encountered in regard particularly to the complexity and the resulting expense in manufacture as well as the simplicity and effectiveness of operation. More particularly, feeding devices with various types of valves and metering elements have been so complex as to inhibit their mass production and use.

SUMMARY OF THE INVENTION

It is the general object of the present invention to provide a device for the liquid feeding of potted plants and the like wherein an exceedingly simple form of construction is realized rendering the device well suited to quantity production and at the same time providing a high degree of effectiveness in use.

DESCRIPTION OF THE PREFERRED EMBODIMENT

Figure 1:
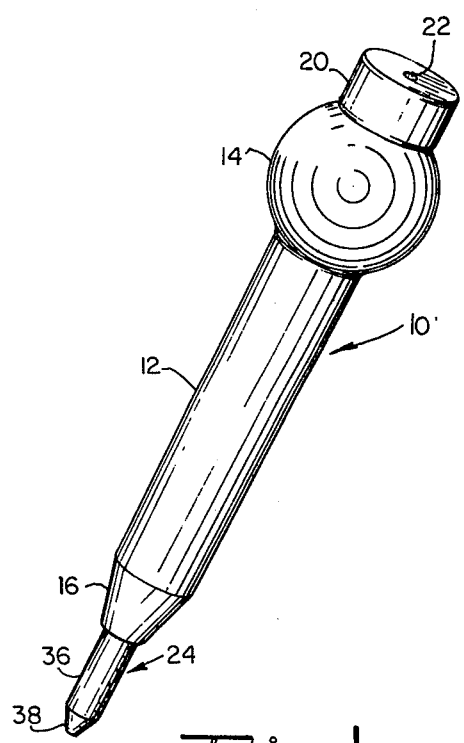
FIG. 1 of the drawings is a perspective view of the plant feeding device of the present invention in assembled form.
Figure 2:
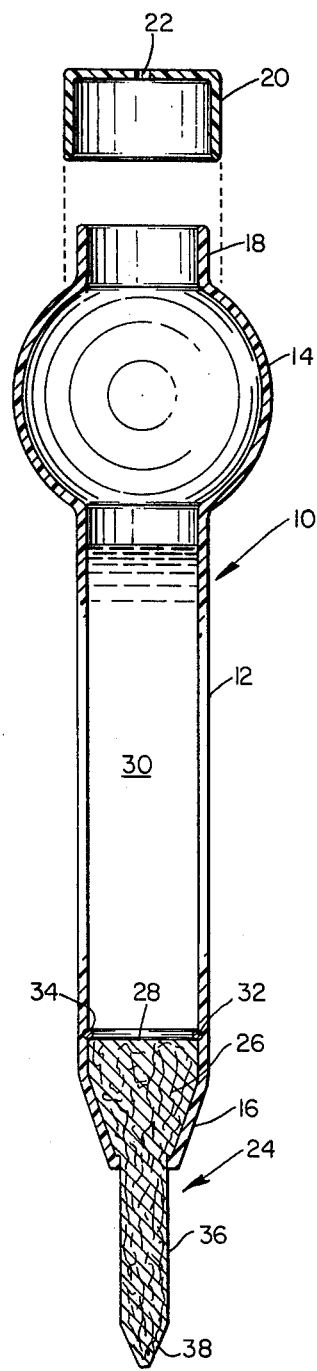
FIG. 2 is a somewhat enlarged vertical sectional view of the device with a top closure element shown in an exploded or disassembled position.
Figure 3:
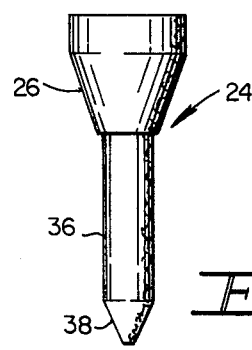
FIG. 3 is a vertical elevational view of the bottom closure and transfer element of the device.

Referring particularly to FIGS. 1 and 2, it will be observed that a feeding device indicated generally at 10 comprises an open end elongated tubular reservoir element having a main body portion 12. The main tubular or cylindrical body portion 12 of the reservoir element resides in intermediate relationship between an enlarged parti-spherical portion optionally provided at 14 and a frusto-conical lower end portion 16. The parti-spherical portion 14 and the frusto-conical portion 16 are formed integrally with the main body portion 12 and each of said portions is hollow for the reception and retention of liquid. Disposed atop the parti-spherical portion 14 is an upper terminal portion 18 which takes a hollow tubular or cylindrical configuration and which is adapted to receive a top closure element 20.

The top closure element 20 may vary in form but preferably comprises a slip-on and frictionally retained cup-shaped cap. As illustrated, the closure element or cap is provided with a small vent opening 22. As will be apparent, the cap 20 may be removed as illustrated in FIG. 2, liquid may then be poured into the reservoir element from above and the cap may thereafter be replaced.

The enlarged parti-spherical portion 14 of the reservoir element may serve as an indicator for determining the proper depth of insertion of the device into the soil adjacent a potted plant. Further, the capacity of the reservoir element is, of course, substantially increased by the said portion. The invention contemplates the insertion of the device into the soil so that the lower end portion 16 of the reservoir element will be disposed in the root region of an adjacent plant. Thus, feeding of the plant occurs at the critical region and a much lesser quantity of water and/or water and liquid plant food is required.

The capacity of the reservoir element may also vary within the scope of the invention, but it is contemplated that a capacity in the approximate range of one to four ounces of liquid will be desirable for the feeding of the ordinary potted plant. As will be explained more fully hereinbelow, the device is designed to transfer such quantity of liquid progressively to the root region of a plant over a period or feeding term of at least several days.

A closure and transfer element for the open lower end portion 16 of the reservoir element 10 is indicated generally by the reference numeral 24. The said element may vary in form within the scope of the invention but preferably includes a frusto-conical upper end portion 26 which projects upwardly within the frusto-conical lower end portion 16 of the reservoir element and which tightly fits the interior wall thereof. At the top of the frusto-conical portion 26, a continuous upwardly exposed absorption surface 28 is provided for the reception and transfer of liquid 30 from the reservoir element.

Optionally, an annular seal 32 is provided adjacent the top surface 28 of the closure and transfer element 24 to prevent leakage of liquid from the reservoir element downwardly along the outer surface of the element and adjacent the inner wall of the reservoir element. As illustrated, the annular seal 32 is partially received within an annular groove 34 formed in the interior wall of the reservoir element. The seal 32 may also serve to prevent the accidental or unintended upward dislodgement of the closure and transfer element 24 during insertion of the device into soil or potting compound adjacent a plant.

An intermediate portion 36 of the closure and transfer element 24 takes a cylindrical configuration over a major portion of its length and is approximately equal in diameter to the lesser diameter of the frusto-conical portion 26 of the element. The said portion 36 projects a substantial distance beneath the reservoir element and provides an exposed peripheral surface for the absorption of liquid therefrom to the adjacent soil. Optionally, a lowermost portion 38 of the closure and transfer element 24 takes on a small generally frusto-conical configuration as illustrated. As will be apparent, insertion of the device into the soil is thus facilitated.

The composition of the closure and transfer element 24, as mentioned above, has the general characteristics of the tip of a felt tip pen. That is, the material to be employed must be absorptive at a controlled rate. It is intended that a slow and long term feeding of the plant roots be provided. Feeding time extends over a period of at least several days as mentioned and may extend over a substantially longer period. Thus, the top-to-bottom transfer rate through the element 24 must be judiciously selected. It is found that a substantially homogeneous pressed felt material of the type mentioned is suitable for the intended purpose. Further, a pressed or hard fibrous nylon material may be employed and a pressed or hard cotton material will also serve the necessary function. As will be apparent, the transfer or metering action of the element 24 is automatic, requires no valving or other moving parts, and is desirably simple in concept. Little or no possibility of failure in service exists. The moist condition of the exposed peripheral surface of the portion 36 is such as to provide for absorption by the soil thereabout at the desired rate for long term feeding.

The type of feeding which may be accomplished with the device of the present invention includes the mere supply of water to the plant roots as well as the supply of water and an intermixed liquid plant food or fertilizer. Further, it is contemplated that solid or granular plant food may be dissolved in water or other liquid in the reservoir for feeding through the closure and transfer element 24. Such plant food must, of course, reach a state of substantially complete liquid form in order to pass through the closure and transfer element for absorption by the surrounding soil. Thus, plant foods or fertilizer not completely soluble in water or other suitable liquid are inappropriate for use in the present device.

I claim:

1. A device for the liquid feeding of potted plants and the like; said device comprising an open end elongated tubular reservoir element for receiving a supply of approximately one to four ounces of liquid, said element having a length such that a lower end portion thereof will be disposed in the root region of a plant when the element is embedded in the soil adjacent the plant, a closure element for the upper end thereof, and a closure and transfer element for the lower end thereof, said lower end closure and transfer element projecting upwardly within a lower end portion of the tubular reservoir element, tightly fitting the interior wall thereof, and providing a continuous exposed surface thereacross, said closure and transfer element also projecting a substantial distance beneath the lower end of the tubular element and having an elongated radially exposed surface of reduced cross sectional dimension and a lower end surface also exposed for feeding the plant and said closure element being of a liquid absorptive material having the general characteristics of the tip of a felt tip pen so as to be structurally independent and receive liquid and absorb at its exposed top surface and transfer the same downwardly with the aid of gravity for absorption by the soil from its lower exposed radial and end surfaces, the top-to-bottom transfer rate through the element being such that said soil absorptive action occurs over a period of at least several days when said device is filled and embedded in soil as aforesaid.

2. A device for the liquid feeding of potted plants and the like as set forth in claim 1 wherein an annular seal is provided to prevent leakage of liquid from the reservoir downwardly along the outer surface of the lower closure and transfer element and adjacent the inner wall of the reservoir.

3. A device for the liquid feeding of potted plants and the like as set forth in claim 1 wherein a lower end portion of said reservoir element takes an inverted frusto-conical configuration, and wherein an upper portion of the lower closure element takes a complementary and tightly fitting shape.

4. A device for the liquid feeding of potted plants and the like as set forth in claim 3 wherein said downwardly projecting lower end portion of said lower closure element is cylindrical over a major portion of its length and approximately equal in diameter to the lesser diameter of said frusto-conical portion thereof.

5. A device for the liquid feeding of potted plants and the like as set forth in claim 4 wherein a lowermost portion of said downwardly projecting portion of said lower closure element is generally frusto-conical in form.

6. A device for the liquid feeding of potted plants and the like as set forth in claim 1 wherein an integral generally cylindrical hollow enlargement is provided adjacent the upper end of said reservoir element.

7. A device for the liquid feeding of potted plants and the like as set forth in claim 1 wherein said lower closure element is of pressed felt construction.

8. A device for the liquid feeding of potted plants and the like as set forth in claim 7 wherein said lower closure element is of pressed fibrous nylon construction.

9. A device for the liquid feeding of potted plants and the like as set forth in claim 1 wherein said lower closure element is of pressed cotton construction.

* * * * *